A. RUBIN.
CLOTH CUTTING MACHINE.
APPLICATION FILED DEC. 31, 1918.
Reissued May 27, 1919.
14,654.
2 SHEETS—SHEET 1.
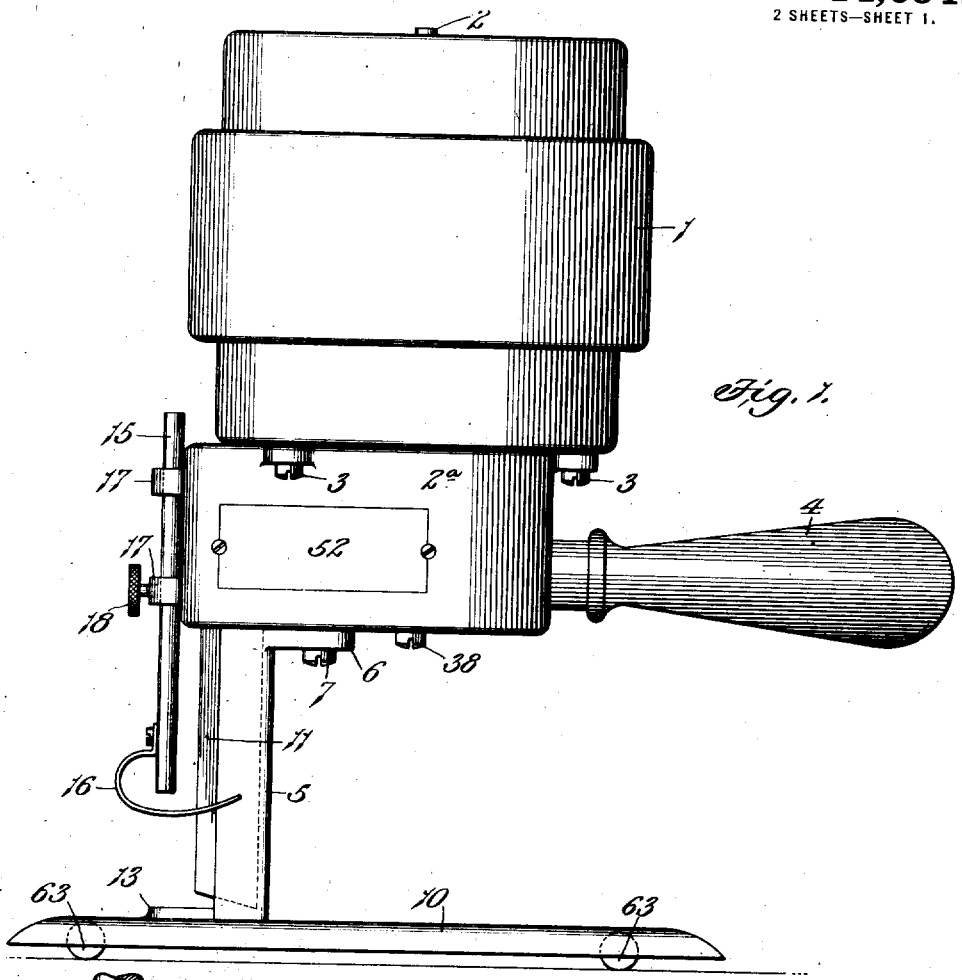
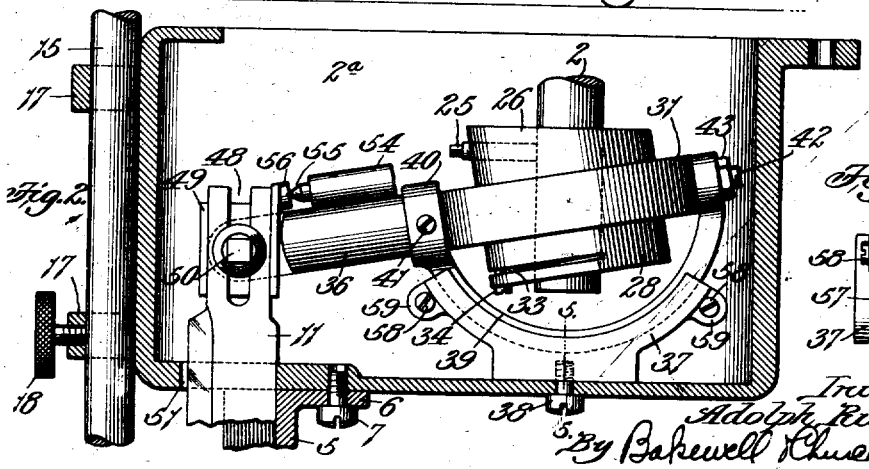
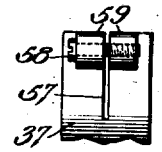
Inventor,
Adolph Rubin.
By Bakewell & Chubb Attys.

A. RUBIN.

CLOTH CUTTING MACHINE.

APPLICATION FILED DEC. 31, 1918.

Reissued May 27, 1919. 14,654.

2 SHEETS—SHEET 2.

Inventor,
Adolph Rubin.
By Bakewell & Chael Attys.

UNITED STATES PATENT OFFICE.

ADOLPH RUBIN, OF ST. LOUIS, MISSOURI.

CLOTH-CUTTING MACHINE.

14,654. Specification of Reissued Letters Patent. Reissued May 27, 1919.

Original No. 1,228,826, dated June 5, 1917, Serial No. 85,310, filed March 20, 1916. Application for reissue filed December 31, 1918. Serial No. 269,143.

*To all whom it may concern:*

Be it known that I, ADOLPH RUBIN, a citizen of the United States, residing at St. Louis, Missouri, have invented a certain new and useful Improvement in Cloth-Cutting Machines, of which the following is a full, clear, and exact description, such as will enable others skilled in the art to which it appertains to make and use the same.

My invention relates to an improved portable cloth-cutting machine, and consists in the novel construction and arrangement of parts hereinafter described and specifically pointed out in the appended claims.

The principal object of my invention is to provide an efficient cloth-cutting machine that is compact, perfectly balanced and so constructed that a small-sized electric motor can be used successfully to operate the reciprocating knife of the machine.

Another object is to provide a cloth-cutting machine in which the operating shaft is directly connected with the reciprocating knife or cutter of the machine by an actuating member carried by said shaft and so combined with same that it rocks or oscillates when the shaft is in operation, thereby overcoming the necessity of using a crank, connecting rod or gears for transmitting the rotary movement of the operating shaft into reciprocating movement.

A further object is to provide a cloth-cutting machine with an improved means for oiling the various movable parts through an oil channel formed in the vertical power (or armature) shaft connecting with lateral channels leading to the various parts to be oiled.

A further object is to provide an improved cloth-cutting machine, wherein the fly wheel action of the vertical motor-armature will stabilize the machine and eliminate much of the vibration resulting from the reciprocation of the knife and driving arm.

A further object is to provide improved means for inclosing the complete driving mechanism in an oil and dust-proof case, whereby the oil will be retained in said case and the dust and dirt of the external atmosphere will be excluded therefrom, and all danger of the operator's clothing getting caught in the mechanism will be entirely avoided.

Further objects and advantages of my invention will hereinafter appear and be particularly defined in the appended claims.

In the drawings:

Figure 1 is a side elevation of a cloth-cutting machine embodying my invention.

Fig. 2 is a vertical section of the dust-proof transmission case at the lower end of the electric motor casing, and showing the contained mechanism on an enlarged scale.

Fig. 7 is a detail view of an adjusting device, made use of in the present form of the machine.

Figure 3:
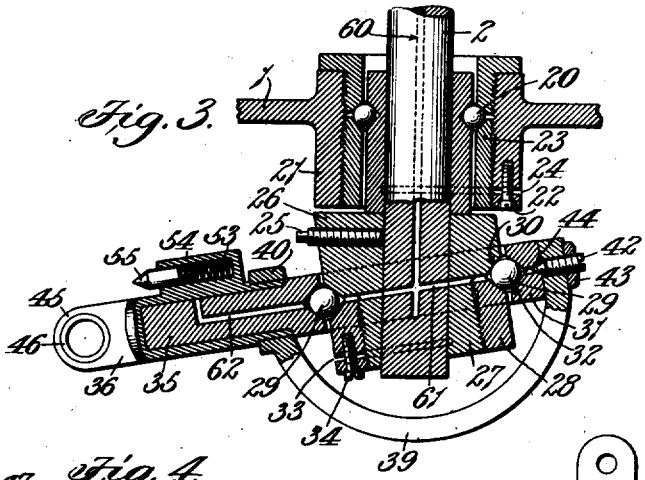
Fig. 3 is a vertical sectional view of the mechanism used for actuating the knife directly from the armature shaft of the motor.

In carrying out the present form of my invention, I provide a common electric motor, represented by the numeral 1, and having the usual outer casing and other unimportant and well-known features. Said motor is placed with its armature shaft 2 in a vertical position, as shown more clearly in Fig. 1.

Beneath the said casing of the electric motor 1, and attached to the latter by means of screws 3, is the dust-proof transmission case $2^a$, from which projects the usual horizontal handle 4.

The numeral 5 indicates the combined standard and knife guide, the upper end of which is provided with a horizontal flange 6, by means of which the said standard is secured to the under surface of the said transmission case $2^a$ by means of screws 7.

The lower end of said standard 5 is provided with a horizontal flange 8, through which suitable screws 9 are passed, to secure said standard in position upon the base 10.

The numeral 11 indicates the knife, which is of the usual construction and is mounted to reciprocate in the said combined standard and knife guide 5.

A slot 12 in the base 10 permits the lower end of said knife to pass downwardly a sufficient distance.

The usual toe plate 13 is detachably secured to the upper surface of said base by means of suitable screws 14, at the edge of the said knife guide.

In carrying out my invention, I preferably make use of a safety-presser-foot rod 15, which carries at its lower end the usual presser-foot 16, and is built so close to the said knife 11 as to make said knife practically "danger-proof".

Suitable guide lugs 17 and a knurled screw 18 are provided for guiding and adjusting the said presser-foot rod.

The said armature shaft 2 passes through a central opening formed in the lower end of the casing of the said electric motor 1, and within said opening is located a common ball-bearing mechanism 20 for the said shaft at that point.

In order that said bearing may be adjusted to take up wear, the lower sleeve or member 23 of the bearing is adjustably mounted in an internally screw-threaded collar 21 on the casing of the motor, said collar being provided at one side with a horizontally-disposed slit or saw kerf 24 and a screw 22 that is arranged at right angles to said slot, as shown in Fig. 3. After the sleeve 23 has been adjusted properly the screw 22 is tightened so as to cause the internal threads on the collar 21 to pinch the threads on the sleeve 23 sufficiently to hold said sleeve in adjusted position.

Fixed upon the lower portion of said armature shaft 2, by any suitable means, such as a set screw 25, is a revoluble body of metal 26, having a threaded shank 27 upon which latter is mounted the adjustable section 28 of a ball bearing.

The said revoluble body of metal 26, in connection with the said adjustable section 28, thus provides a common ball race in which are located the balls 29.

Furthermore, the said body of metal 26 and the said adjustable section 28 thus provide what may be termed an annular groove at the periphery of the said parts.

A very important portion of my invention will now be brought out, and that is the fact that the walls of the said annular groove at the outer periphery of the said parts 26 and 28, are located in a plane at an acute angle relative to the axis of the said armature shaft 2, whereby when the said parts are rotated the walls of the said groove will "wabble"; in other words, I thereby provide a wabbling groove.

Encircling the said body 26 and the said adjustable section 28, and inclosing the said wabbling groove (which I will designate by the numeral 30), is a wabbling ring or yoke 31 having upon its inner periphery a groove or ball race 32.

Said balls 29, or other suitable projections, project from the said walls of the said wabbling groove 30 to the walls of the groove 32 of the said ring or yoke 31, and thereby connect the said ring or yoke to the said revoluble parts carried by the lower portion of the armature shaft.

When the bearing above referred to becomes worn it can be adjusted easily to take up the wear by screwing the member 28 inwardly on the threaded shank 27, the member 28 being provided with a locking means consisting of a screw 34 arranged at right angles to a slot or saw kerf 33 formed in one side of the member 28, as shown in Figs. 2 and 3. When the screw 34 is tightened the coöperating threads on the member 28 and shank 27 will be pinched sufficiently to hold the member 28 in adjusted position.

Formed integral with the outer face of the said wabbling ring or yoke 31 is a cylindrical shank 35, which is loosely mounted to rock within the tubular driving arm 36.

Every one of the parts mentioned as "wabbling" and as mounted "to rock," is entirely supported by the armature shaft 2, and all of them make up a "rockable arm" for reciprocating the knife 11.

In order to prevent the said yoke 31 and its shank 35 from rotating with the shaft 2, some suitable form of a guide is necessary, and I will now proceed to described one form of such guide.

I fix on the interior of the said dust-proof case $2^a$ a segmental bearing 37, which is U-shaped in cross section, and secured to the bottom of said case by means of a screw 38.

Mounted to rock within the said segmental bearing 37 is a semi-circular guide bar 39, one end of which is provided with a ring 40 which embraces the inner end of the driving arm 36 and is fixed thereto by means of a set screw 41. (See Fig. 2).

The opposite end of the said semi-circular guide bar 39 is provided with a pivot screw 42 and a lock nut 43.

Said pivot screw 42 projects into and engages a conical bearing 44 formed in the outer periphery of the said wabbling yoke 31 in axial alinement with the said shank 35 of said yoke.

By referring to Fig. 3, it will be noted that the members 26 and 28 in which the ball race 30 is formed are so positioned on the shaft 2 that said ball race will be arranged concentric with relation to the longitudinal axis of the shaft 2, as well as inclined with relation to the longitudinal axis of said shaft. Consequently, when the shaft 2 revolves the yoke 31, which is connected with the members 26 and 28 by means of the balls 29, will wabble or rock unevenly and thus oscillate the driving arm 36 vertically.

At the outer end of the said driving arm 36 is the knife-clamping means, which consists of an integral cylindrical shell 45 projecting at a right angle from the said arm, and interiorly lined with a bushing 46, within which latter rocks a tubular journal 46ª.

Threaded within one end of the said tubular journal 46ª is a cap screw 47, which engages the adjacent ends of the said journal and said fixed bushing 46, and prevents said journal from sliding toward the knife 11.

Figure 4:
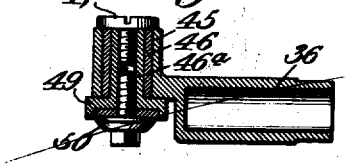
Fig. 4 is a detail horizontal section of the knife driving arm and its attached knife clamp.
Figure 5:
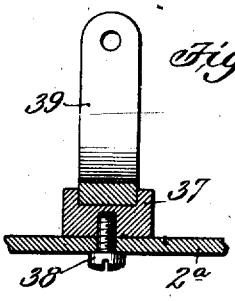
Fig. 5 is a detail section of the driving arm guide, the section being taken on line 5—5 of Fig. 2.
Figure 8:
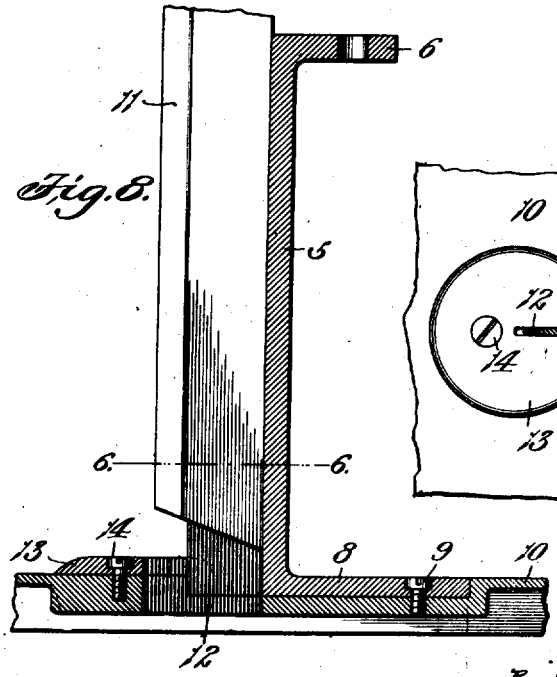
Fig. 8 is an enlarged vertical section of the standard, and a portion of the base, and showing the knife in side elevation.
Figure 6:
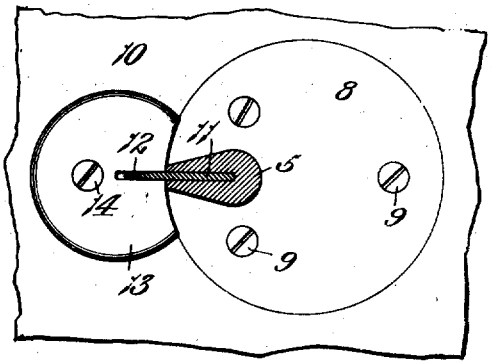
Fig. 6 is a top plan view of a portion of the base, with the standard and knife shown in cross section, the section being taken on line 6—6 of Fig. 8.

The said knife 11 is provided with the usual slotted upper end 48, and the same is clamped in the knife holder 49 by means of a suitable screw 50, which is threaded into the end of said tubular journal 46ª which is opposite that in which the said screw 47 is located. (See Fig. 4).

The said knife holder 49 is fixed to (or formed integral with) the adjacent end of the said tubular journal 46ª, so that when said journal rocks in its bearing the said knife holder will rock with it.

A slot 51 in the bottom of the said dust-proof case 2ª permits the said knife to work freely up and down.

A suitable removable door or plate 52 is provided on said transmission case 2ª, for permitting ready access to the knife clamp and other parts of the mechanism within said case.

A suitable compression coil spring 53 is mounted in a tubular casing 54 on top of the said driving arm 36, and urges a sliding pin 55 having a conical outer end into contact with an adjacent bearing 56 fixed on the said knife holder 49 at a plane above the axis of said knife holder journal 46ª, and thereby causes the back of said knife 11 to hug the back of the said standard 5, during reciprocation of the knife.

As shown in Fig. 7, the ends of the said segmental bearing 37 are provided with slits 57 which are adapted to be closed by means of screws 58 engaging clamping lugs 59, when it is necessary to adjust the opposite vertical walls of the said segmental bearing to take up wear upon the said semi-circular guide bar 39.

*The oiling mechanism.*

My improved means for oiling the various movable parts of my machine consists of a vertical oil channel 60 formed axially in the vertical armature shaft 2 of the motor 1, so as to extend almost the entire length of said shaft; and lateral oil channels 61 leading from the said vertical channel into the adjacent wabbling groove 30 of the revoluble bodies carried by the said shaft within the said dust-proof case 2ª, and from thence to the various other parts of the mechanism by means of connecting channels such as that indicated by the numeral 62, which is a channel formed for the feeding of oil from the said groove of the wabbling yoke 31 to the interior of the said tubular driving arm 36, and adapted to lubricate the said shank 35 of the said wabbling yoke.

The said base 10 is mounted upon the usual rolls 63, for an obvious purpose.

*The operation.*

The operation of the electric motor 1 is the same as that of any common electric motor and need not be described, except to say that the usual connections for supplying current and light should be provided.

When the armature shaft 2 rotates, during the operation of the said motor 1, the bodies which form the walls of the said wabbling groove 30 rotate with the said shaft, and cause the walls of the said groove to "wabble" and carry with them the balls or "projections" 29 which engage the walls of the said groove and also engage the walls of the groove 32 in the said wabbling yoke 31.

Such engagement of said walls by the said "projections" or (balls 29) causes the said yoke 31 to be wabbled a corresponding amount; but said yoke cannot rotate, as it is securely held against rotation by the said semi-circular guide bar 39, and the fixed segmental bearing 37.

However, the said wabbling yoke 31 is free to (and does) rock with the said semi-circular guide bar 39, and thereby the said driving arm 36 and its attached knife 11 are moved in a vertical plane, and the said knife is caused to reciprocate in its guide and standard 5, so that it may cut the cloth in the desired manner.

The operation of the remaining parts of my improved mechanism is apparent to skilled mechanics, and will not be described any further herein.

I do not limit myself to the exact construction herein shown and described, and changes may be made in the general organization as well as in the particular construction of some component elements of my invention without departing from the spirit and scope thereof; and while I have shown the machine provided with an operating shaft consisting of a vertically-disposed armature shaft, and one form of mechanism for transmitting motion directly from the lower end thereof to a reciprocating knife, yet any other mechanism which would suggest itself to the mind of a skilled workman without invention may be substituted for that herein described.

For instance, instead of the semi-circular guide bar 39 and its segmental bearing 37, which are herein described as a "guide" for the driving arm 36 (to guide the latter in a vertical plane), any well known form of guide may be substituted for such elements.

Much of the lateral vibration of the machine is prevented by connecting the vertically-reciprocating knife to the lower end of the vertical armature shaft, as shown and described, because the shocks produced by the momentum of said knife (at the end of its strokes) are thus transmitted endwise to said shaft, and are almost entirely absorbed by the heavy armature, without any appreciable lateral vibration of the machine. Furthermore, as the knife operating member is supported on and operated directly by the armature shaft of the motor through means of a ball bearing, friction is reduced to a minimum, thereby enabling a small-sized electric motor to be used successfully for operating the knife of the machine.

I claim:

1. A cloth-cutting machine, comprising a reciprocating knife, a vertical electric motor having a vertical armature shaft, suitable casings and framing, a rockable arm for reciprocating said knife, said arm being mounted at the lower end of said armature shaft and entirely supported thereby, and means carried by said shaft for rocking said arm.

2. A cloth-cutting machine, comprising a reciprocating knife, a vertical electric motor having a vertical armature shaft and casing for said motor, a transmission case located beneath said motor casing and arranged to support said motor and its casing, a standard for supporting said transmission case, a base on which said standard is mounted, a rockable arm for reciprocating said knife, said arm being mounted at the lower end of said armature shaft and entirely supported thereby, and means carried by said shaft for rocking said arm.

3. A cloth-cutting machine, comprising a reciprocating knife, a vertical electric motor having a vertical armature shaft, suitable casings and framing, a rockable arm for reciprocating said knife, bodies fixed upon the lower portion of said armature shaft and having a wabbling groove formed between them, balls located in said wabbling groove and connecting said rockable arm to the said bodies, so that said rockable arm is entirely supported by the said armature shaft, and a guide for preventing said rockable arm from rotating with said shaft while permitting said arm to rock.

4. A cloth-cutting machine having a vertical electric motor and a vertical armature shaft, a reciprocating knife, suitable casings and framing, a rockable driving arm for reciprocating said knife, bodies fixed on the lower portion of said armature shaft and provided with inclined walls which form the walls of a wabbling groove, said rockable driving arm also having inclined walls which form the walls of a ball race therein, balls located in said wabbling groove and in said ball race and connecting said rockable arm to the said armature shaft so that said rockable arm is entirely supported by the lower portion of said armature shaft, a suitable guiding device for preventing said rockable arm from rotating with said shaft while permitting said arm to rock, and a knife holder carried by said rockable arm.

5. A cloth-cutting machine having a vertical electric motor, the armature shaft of which is provided adjacent its lower end with a transverse oil channel, a body fixed upon said shaft to rotate therewith and having a wabbling groove in its periphery, and arranged so that the transverse oil channel in said shaft is in communication with said wabbling groove, a rockable driving shank having an oil channel in communication with said wabbling groove, means for connecting said driving shank to the walls of said wabbling groove so that when said body is rotated the said driving shank will be rocked, a driving arm carried by said shank and adapted to be oiled by same, and a knife holder connected to said driving arm.

6. A cloth-cutting machine provided with a reciprocating knife, an operating shaft that extends substantially parallel to the direction of movement of said knife, and an actuating member for said knife, supported by said operating shaft, and so combined with same that said member will rock when said shaft rotates.

7. A cloth-cutting machine provided with a vertically-reciprocating knife, an electric motor whose armature shaft is arranged vertically, an actuating member for said knife, and coöperating means on said member and armature shaft for supporting said member and causing it to rock vertically when said shaft rotates.

8. A cloth-cutting machine provided with a reciprocating knife, an operating shaft that extends substantially parallel to the direction of movement of said knife, a rockable actuating member for said knife supported by said shaft and operated positively in both directions by the rotary movement of said shaft, and means for preventing said member from rotating with said shaft.

9. A cloth-cutting machine, comprising an electric motor, a reciprocating knife, an actuating member for said knife arranged at an angle with relation to the armature shaft of said motor and combined with an element that surrounds said shaft, and a ball bearing arranged between said element and actuating member and provided with ball race members formed in such a manner that said actuating member will rock when said shaft rotates.

10. A cloth-cutting machine, comprising a reciprocating knife, an operating shaft that extends substantially parallel to the direction of movement of said knife, a ball race carried by said shaft and inclined with relation to the longitudinal axis of said shaft, an actuating means for said knife provided with a coöperating ball race, and ball bearings arranged in said ball races for causing the knife to reciprocate when the operating shaft rotates.

11. A cloth-cutting machine, comprising a rotatable operating shaft, a groove extending circumferentially around said shaft and inclined relatively to the longitudinal axis of the shaft, a part surrounding said shaft and provided with a coöperating groove, devices arranged in said grooves for causing said part to wabble or rock unevenly when the shaft rotates, means for preventing said part from rotating with the shaft, and a reciprocating cutter operated by said wabbling part.

12. A cloth-cutting machine, comprising a rotatable operating shaft, a groove extending circumferentially around said shaft and inclined relatively to the longitudinal axis of the shaft, a part surrounding said shaft and provided with a coöperating groove, devices arranged in said grooves for causing said part to wabble or rock unevenly when the shaft rotates, means for preventing said part from rotating with the shaft, a reciprocating cutter operated by said wabbling part, and means for enabling one of said ball races to be adjusted so as to take up the wear in the bearing.

13. A cloth-cutting machine provided with a reciprocating knife, an electric motor whose armature shaft extends substantially parallel to the direction of movement of said knife, an actuating member for said knife, an inclined groove extending circumferentially around the armature shaft, a yoke surrounding said shaft at a point in alinement with said groove and provided with a part that engages said actuating member, and means coöperating with said yoke and groove for causing the yoke to wabble or rock unevenly when said armature shaft rotates.

14. A cutting machine provided with a rotatable operating shaft, a cutter, a rockable member for actuating said cutter, and means for supporting said actuating member from said shaft and causing it to rock when said shaft rotates.

15. A cutting machine provided with a rotatable operating shaft, a cutter, a rockable actuating member for said cutter, a groove extending circumferentially around said shaft and inclined relatively to the longitudinal axis of said shaft, a part surrounding said shaft and combined with said actuating member, and means coöperating with said part and groove for causing said actuating member to rock when said shaft rotates.

16. A cloth-cutting machine provided with a motor whose armature shaft is equipped with a longitudinal oil channel, a reciprocating knife, a tubular actuating arm for said knife, a yoke surrounding the armature shaft of the motor and provided with a shank that is arranged in said actuating arm, a ball bearing arranged between said armature shaft and yoke for causing the yoke to wabble when the armature shaft revolves, and means for conducting the lubricating medium from the oil channel in the armature shaft to said bearing and to the outer surface of said shank.

17. A cloth-cutting machine, comprising a base, a standard on said base, an electric motor carried by said standard and arranged with its armature shaft disposed vertically, a reciprocating knife, and an actuating member for said knife supported by the armature shaft of the motor and combined with same in such a manner that it will rock when said shaft rotates.

In testimony whereof, I hereunto affix my signature in the city of St. Louis, State of Missouri, this 27th day of December, 1918.

ADOLPH RUBIN.